United States Patent
Arifpin et al.

(10) Patent No.: US 10,252,926 B2
(45) Date of Patent: Apr. 9, 2019

(54) WASTEWATER TREATMENT PROCESS FOR REMOVING CHEMICAL OXYGEN DEMAND

(71) Applicant: ECOLAB USA INC., St. Paul, MN (US)

(72) Inventors: Nugraha Yohanes Arifpin, Bandung (ID); Isa Alfadila, Tangerang (ID)

(73) Assignee: ECOLAB USA INC., St. Paul, MN (US)

(*) Notice: Subject to any disclaimer, the term of this patent is extended or adjusted under 35 U.S.C. 154(b) by 0 days.

(21) Appl. No.: 15/253,459

(22) Filed: Aug. 31, 2016

(65) Prior Publication Data

US 2017/0057849 A1    Mar. 2, 2017

Related U.S. Application Data

(60) Provisional application No. 62/212,575, filed on Aug. 31, 2015.

(51) Int. Cl.
| C02F 1/56 | (2006.01) |
| C02F 1/52 | (2006.01) |
| C02F 101/30 | (2006.01) |
| C02F 101/32 | (2006.01) |
| C02F 103/36 | (2006.01) |

(52) U.S. Cl.
CPC .............. *C02F 1/5245* (2013.01); *C02F 1/56* (2013.01); *C02F 2101/301* (2013.01); *C02F 2101/308* (2013.01); *C02F 2101/32* (2013.01); *C02F 2103/36* (2013.01); *C02F 2209/04* (2013.01); *C02F 2209/06* (2013.01)

(58) Field of Classification Search
CPC ..................................................... C02F 1/5245
See application file for complete search history.

(56) References Cited

U.S. PATENT DOCUMENTS

| 3,951,711 A | 4/1976 | Snyder |
| 4,271,028 A * | 6/1981 | Marfurt .................. C02F 1/463 |
| | | 205/688 |
| 4,321,143 A | 3/1982 | Wilms et al. |
| 5,202,030 A | 4/1993 | Axnäs |
| 5,218,304 A | 6/1993 | Kinlen et al. |
| 5,342,510 A | 8/1994 | Eden et al. |
| 5,360,551 A * | 11/1994 | Weber ................... C02F 1/5209 |
| | | 210/719 |
| 5,505,857 A * | 4/1996 | Misra ................... C01G 49/009 |
| | | 210/709 |

(Continued)

OTHER PUBLICATIONS

International Search Report and Written Opinion from PCT App. No. PCT/US2016/049749, dated Dec. 12, 2016 (12 pages).

(Continued)

*Primary Examiner* — Peter Keyworth
(74) *Attorney, Agent, or Firm* — Eric D. Babych; Brinks Gilson & Lione

(57) ABSTRACT

This disclosure provides methods and compositions for removing COD-causing contaminants from water, such as cosmetic product manufacturing wastewater and personal care product manufacturing wastewater. The methods involve controlling system parameters in order to hold iron as an iron(II) species. Iron(II) has increased solubility and therefore is more active against the specific contaminants present in the wastewaters.

9 Claims, 1 Drawing Sheet

(56) References Cited

U.S. PATENT DOCUMENTS

| | | | |
|---|---|---|---|
| 5,798,940 | A | 8/1998 | Bratton et al. |
| 7,141,175 | B2 | 11/2006 | Verma |
| 8,641,888 | B2 | 2/2014 | Rael et al. |
| 8,658,094 | B2 | 2/2014 | Hicks et al. |
| 8,658,095 | B2 | 2/2014 | Hicks et al. |
| 8,906,202 | B2 | 12/2014 | Grattan et al. |
| 2003/0006197 | A1* | 1/2003 | Mahoney .......... C02F 1/56 210/725 |
| 2003/0234219 | A1* | 12/2003 | Verma ............. C02F 3/006 210/614 |
| 2005/0274678 | A1 | 12/2005 | Chen et al. |
| 2007/0090048 | A1 | 4/2007 | Verma |
| 2008/0110826 | A1* | 5/2008 | Prigione .......... B01J 20/24 210/611 |
| 2010/0181236 | A1 | 7/2010 | Senda |
| 2011/0303871 | A1* | 12/2011 | Burba ............. C02F 1/288 252/184 |

OTHER PUBLICATIONS

Bautista, P., A.F. Mohedano, M.A. Gilarranz, J.A. Casas, and J.J. Rodriguez. "Application of Fenton oxidation to cosmetic wastewaters treatment," Journal of Hazardous Materials. vol. 143 (2007), pp. 128-134.

Bautista, P., A.F. Mohedano, N. Menendez, J.A. Casas, and J.J. Rodriguez. "Catalytic wet peroxide oxidation of cosmetic wastewaters with Fe-bearing catalysts," Catalysis Today. vol. 151 (2010), pp. 148-152.

El-Gohary, F., A. Tawfik, and U. Mahmoud. "Comparative study between chemical coagulation/precipitation (C/P) versus coagulation/ dissolved air flotation (C/DAF) for pre-treatment of personal care products (PCPs) wastewater," Desalination. vol. 252 (2010), pp. 106-112.

Perdigón-Melón, J.A., J.B. Carbajo, A.L. Petre, R. Rosa!, and E. García-Calvo. "Coagulation—Fenton coupled treatment for ecotoxicity reduction in highly polluted industrial wastewater," Journal of Hazardous Materials. vol. 181 (2010), pp. 127-132.

Puyol, D., V.M. Monsalvo, A.F. Mohedano, J.L. Sanz, and J.J. Rodriguez. "Cosmetic wastewater treatment by upflow anaerobic sludge blanket reactor," Journal of Hazardous Materials. vol. 185 (2011), pp. 1059-1065.

Suárez, Sonia, Marta Carballa, Francisco Omil, and Juan M. Lema. "How are pharmaceutical and personal care products (PPCPs) removed from urban wastewaters?" Reviews in Environmental Science and Bio/Technology. vol. 7 (2008), pp. 125-138.

Zeng, Xiangying, Guoying Sheng, Hongyan Gui, Duohong Chen, Wenlan Shao, and Jiamo Fu. "Preliminary study on the occurrence and distribution of polycyclic musks in a wastewater treatment plant in Guandong, China," Chemosphere. vol. 69 (2007), pp. 1305-1311.

* cited by examiner

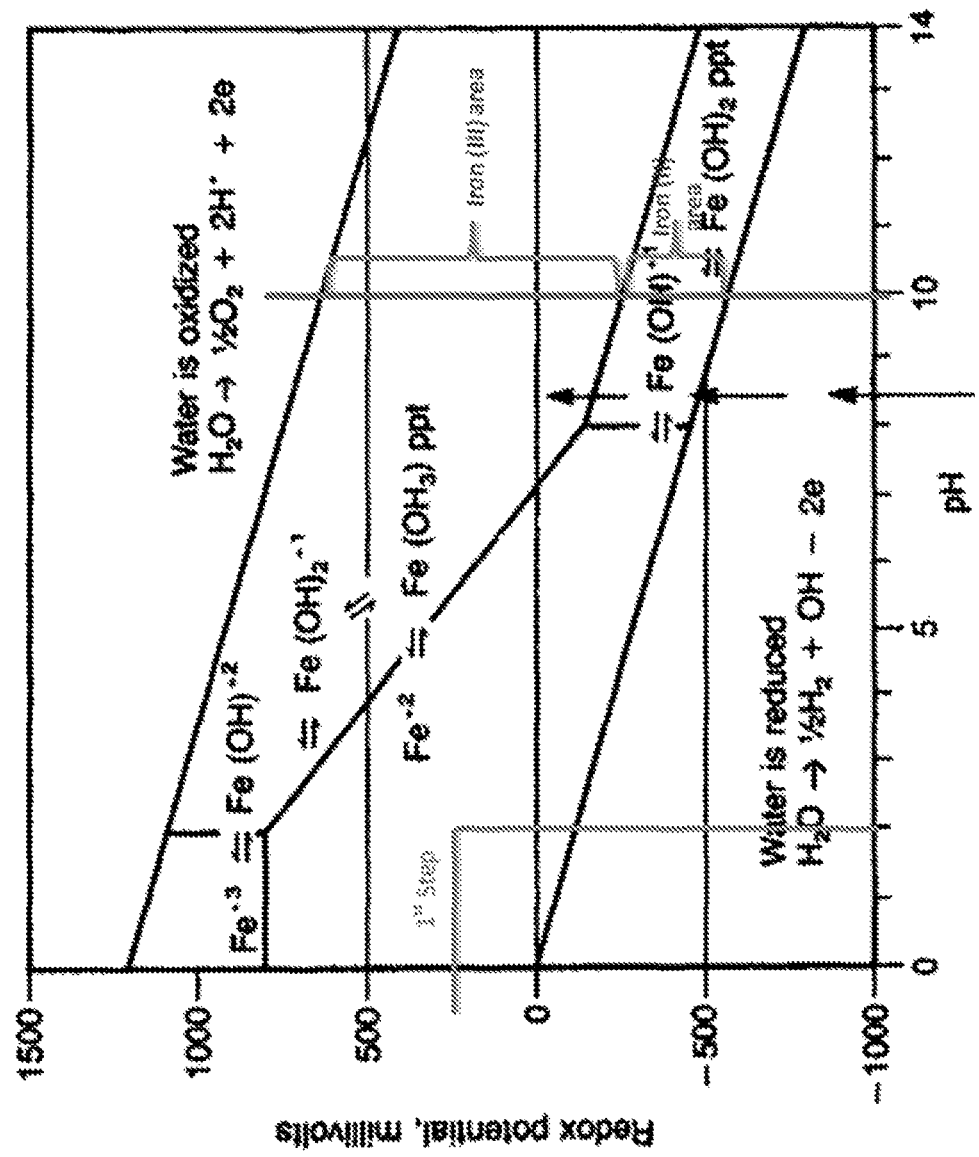

WASTEWATER TREATMENT PROCESS FOR REMOVING CHEMICAL OXYGEN DEMAND

TECHNICAL FIELD

This disclosure relates to compositions, methods, and apparatuses for improving the treatment of wastewater, such as wastewater from the cosmetics industry.

BACKGROUND

The production of cosmetic products, such as skin care products, hair care products, fragrances, etc., typically generates wastewaters that are difficult to treat. These wastewaters include, for example, sizing agents, wetting chemicals, dyes, pigments, softening agents, surfactants, oils, natural oils, fragrances, and other additives. Due to the presence of these materials, the wastewaters are often characterized by a high pH, suspended solids (SS), chemical oxygen demand (COD), color, and alkalinity. Such wastewaters must be suitably treated before they may be discharged into sewer systems.

BRIEF SUMMARY

At least one embodiment of this disclosure is directed to a method of reducing the COD of wastewater comprising at least one contaminant. The method comprises the steps of contacting the wastewater with an iron compound at a pH of about 3 or less, subsequently forcing the iron to assume an iron(II) species, and finally removing a contaminant-iron precipitate. The iron may be forced to assume an iron(II) species by controlling system parameters, such as pH and/or oxidation-reduction potential (ORP).

The method may further comprise the step of adding a flocculant to the wastewater. The flocculant used in connection with the present disclosure is not limited and can be anionic, cationic, or nonionic, for example. In some embodiments, the cationic charge or the anionic charge of the flocculant may be from about 0 to about 80 mole %. Useful flocculants may have high molecular weights, such as about 1,000,000 Da or above. The flocculant may be a polymer comprising acrylic acid and/or acrylamide, for example. The flocculant may be added to the wastewater while the ORP of the wastewater is kept within an acceptable range.

An acceptable ORP may be about −250 mV or higher. The ORP acceptable range may be controlled by a Pourbaix diagram to produce iron(II) at a given pH. The mV may deviate from the upper or lower bounds of the Pourbaix diagram by up to about 10% (with the understanding that 10% of 100 mV is 10 mV). In some embodiments, the wastewater may be wastewater from a cosmetic manufacturing process or a personal care product manufacturing process. These manufacturing processes may produce products such as skin care products, hair care products, make-up, fragrances, deodorants, and/or sun screens.

The contaminants of the wastewater may comprise one or more sizing agents, wetting chemicals, dyes, pigments, softening agents, surfactants, oils, natural oils, fragrances, and any combination thereof. The COD reduction may be at least 10% better than a method where a greater amount of iron is added but the iron was not forced to assume, at least in part, an iron(II) configuration.

BRIEF DESCRIPTION OF THE DRAWING FIGURES

A detailed description of the invention is hereafter described with specific reference being made to the drawings in which:

FIG. 1 is a Pourbaix Diagram that illustrates the ORP and pH levels where the iron(II) species forms.

The drawing figure is only an exemplification of the principles of this disclosure and is not intended to limit the disclosure to the particular embodiments illustrated.

DETAILED DESCRIPTION

The following definitions are provided to help determine how terms used in this application may be construed.

"Coagulant" means a water treatment chemical often used in a solid-liquid separation stage to neutralize charges of suspended solids/particles so that they can agglomerate. Coagulants are often categorized as inorganic coagulants, organic coagulants, and blends of inorganic and organic coagulants. Inorganic coagulants often comprise aluminum or iron salts, such as aluminum sulfate/chloride, ferric chloride/sulfate, polyaluminum chloride, and/or aluminum chloride hydrate. Organic coagulants are often positively charged polymeric compounds with low molecular weights. They can include, for example, polyamines, polyquaternary amines, polydiallyldimethylammonium chloride (poly-DADMAC), epichlorohydrin-dimethyl amine (epi-DMA), and polyvinylpyridine. Coagulants often have a higher charge density and a lower molecular weight than a flocculant. In certain instances, when coagulants are added to a liquid containing finely divided suspended particles, they destabilize and aggregate the solids through the mechanism of ionic charge neutralization.

"DADMAC" means monomeric units of diallyldimethyl-ammonium chloride. DADMAC can be present in a homopolymer or in a copolymer comprising other monomeric units.

"Dextran" is a polysaccharide characterized as being an α-D-1,6 glucose-linked glucan with side chains 1-3 linked to the backbone units of the polysaccharide.

"Dilution Filtration" means a process in which a material undergoing a filtration process is also being diluted by the addition of liquid to the material. Dilution filtration can be simultaneous (the filtration and dilution occur at the same time) and/or staged (the dilution and filtration processes occur one after the other) and can have one or more relative rates whereby liquid can be removed from the material at a faster, slower, and/or the same rate as liquid is added by the dilution process.

"Filter Cake" means the accumulation of solid matter that is retained on a filter. It may increase in the course of filtration and become thicker as more particulate matter is retained.

"Flocculant" means a composition of matter that induces agglomeration of suspended particles. The agglomeration can result, for example, due to weak physical forces, such as surface tension and adsorption. As used herein, flocculation includes those descriptions recited in ASTM E 20-85, as well as those recited in Kirk-Othmer Encyclopedia of Chemical Technology, 5th Edition, (2005), (Published by Wiley, John & Sons, Inc.). Flocculants sometimes have a low charge density but sometimes they can have high charge densities. For example, flocculants may be 0 to about 80 mole % cationic, 0 to about 80 mole % anionic, or nonionic. They can have high molecular weights, such as about 1,000,000 or above. When added to a liquid containing finely divided suspended particles, the flocculant may destabilize and aggregate the solids through mechanisms such as interparticle bridging.

"Flocculating Agent" means a composition of matter which, when added to a liquid containing suspended particles, destabilizes and aggregates the particles. Flocculants and coagulants may be referred to herein as "flocculating agents".

"GPAM" means glyoxalated polyacrylamide, which is a polymer made from polymerized acrylamide monomers where various acrylamide polymeric units have been reacted with glyoxal groups. Representative examples of GPAM are described in U.S. Patent Application Publication No. 2009/0165978, the disclosure of which is incorporated into the present application in its entirety.

"HLB" means the hydrophillic-lipophillic balance of a material. HLB can be determined by the equation:

HLB=20*Mh/M

"Mh" is the molecular mass of the hydrophilic portion of the molecule and "M" is the molecular mass of the whole molecule. An HLB value of 0 corresponds to a completely lipidphilic/hydrophobic material and a value of 20 corresponds to a completely hydrophilic/lipidphobic material. HLB values are characterized as:

HLB<10: Lipid soluble (water insoluble);
HLB>10: Water soluble (lipid insoluble);
HLB from 4 to 8 indicates an anti-foaming agent;
HLB from 7 to 11 indicates a W/O (water in oil) emulsifier;
HLB from 12 to 16 indicates O/W (oil in water) emulsifier;
HLB from 11 to 14 indicates a wetting agent;
HLB from 12 to 15 indicates a detergent; and
HLB of 16 to 20 indicates a solubilizer or hydrotrope.

"Membrane" means a structure having lateral dimensions much greater than its thickness though which a mass transfer may occur. Membranes are useful for filtering liquids.

"MF" means microfiltration, which is a membrane-based separation process in which particles and dissolved macromolecules larger than 0.1 μm do not pass through the membrane. In some instances, MF may be pressure driven.

"NF" means nanofiltration, which is a membrane-based separation process in which particles and dissolved macromolecules larger than 1 nm do not pass through the membrane. In some instances, NF may be pressure driven.

"RO" means reverse osmosis, which is a water purification technology that uses a hydrostatic force (a thermodynamic parameter) to overcome osmotic pressure (a colligative property) in the water to remove one or more unwanted items from the water. RO may be a membrane-based separation process wherein the osmotic pressure is overcome by the hydrostatic force. RO may be driven by chemical potential and/or it may be pressure driven. RO can remove many types of molecules and ions from solutions and is used in industrial processes and in producing potable water. In a pressurized RO process, the solute is retained on the pressurized side of the membrane and the pure solvent is allowed to pass to the other side. In order to be selective, an RO membrane may be sized to prohibit large molecules or ions from passing through the pores of the membrane. Smaller components of the solution (as well as the solvent itself) may pass through the membrane. In some cases, dissolved molecules larger than 0.5 nm may not pass through membrane.

"RSV" means reduced specific viscosity, which is an indication of polymer chain length and average molecular weight. The RSV is measured at a given polymer concentration and temperature and is calculated as follows:

$$RSV = \frac{\left[\left(\frac{\eta}{\eta_o}\right) - 1\right]}{c}$$

wherein $\eta$=viscosity of polymer solution; $\eta o$=viscosity of solvent at the same temperature; and c=concentration of polymer in solution. As used herein, the units of concentration "c" are (grams/100 ml or g/deciliter). Therefore, the units of RSV are dl/g. The RSV is measured at 30° C. The viscosities ($\eta$ and $\eta o$) are measured using a Cannon-Ubbelohde semimicro dilution viscometer, size 75. The viscometer is mounted in a perfectly vertical position in a constant temperature bath adjusted to about 30° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under substantially identical conditions.

"S-Value" is the measure of the degree of micro aggregation of colloidal materials. It can be obtained from measurements of viscosity of the colloidal system and is often related to the performance of the colloidal end product.

"Separation" means a mass transfer process that converts a mixture of substances into two or more distinct product mixtures, at least one of which is enriched in one or more of the mixture's constituents. It includes, for example, adsorption, centrifugation, cyclonic separation, density-based separation, chromatography, crystallization, decantation, distillation, drying, electrophoresis, elutriation, evaporation, extraction, leaching extraction, liquid-liquid extraction, solid-phase extraction, flotation, dissolved air flotation (DAF), froth flotation, flocculation, filtration, mesh filtration, membrane filtration, microfiltration, ultrafiltration, nanofiltration, reverse osmosis, fractional distillation, fractional freezing, magnetic separation, precipitation, recrystallization, sedimentation, gravity separation, sieving, stripping, sublimation, vapor-liquid separation, winnowing, zone refining, and any combination thereof.

"Stable Emulsion" means an emulsion in which droplets of a material dispersed in a carrier fluid that would otherwise merge to form two or more phase layers are repelled from each other by an energy barrier. The energy barrier may be about 20 kT and the repulsion may have a half-life of at least a few years. Descriptions of emulsions and stable emulsions are provided in *Kirk-Othmer, Encyclopedia of Chemical Technology*, Fourth Edition, volume 9, pages 397-403.

"Submerged Membrane" means a membrane positioned entirely beneath the surface layer of a liquid and which effects mass transfer of materials suspended within the liquid.

"Surfactant" is a general term which includes, for example, anionic, nonionic, cationic, and zwitterionic surfactants. Exemplary surfactants are described in *Kirk-Othmer, Encyclopedia of Chemical Technology*, Third Edition, volume 8, pages 900-912, and *McCutcheon's Emulsifiers and Detergents*, both of which are incorporated herein by reference in their entirety.

"Ultrafiltration" means a process of filtration in which hydrostatic pressure forces a filtrate liquid against a semipermeable membrane. Suspended solids and solutes of high molecular weight are retained while water and low molecular weight solutes pass through the membrane. It is commonly used for purifying and concentrating macromolecular ($10^3$-$10^6$ Da) solutions and can include, for example, microfiltration, nanofiltration, and gas separation. Ultrafiltration is further described in *Ultrafiltration and Microfiltration Handbook, Second Edition*, by Munir Cheryan, Published by CRC Press LLC, (1998), the contents of which are incorporated into the present application in their entirety.

At least one embodiment of this disclosure is directed to a method of treating water. The water may be wastewater from the manufacture of one or more cosmetics products or personal care products. The wastewater comprises at least one contaminant. The method may comprise treating the wastewater in a two-step process but the process can include more or less than two steps. The first step may comprise contacting the wastewater with a ferric composition while the water is kept at a low pH, such as about 6 or less, about 4 or less, or about 2 or less. An additional step may comprise contacting the wastewater with a flocculant under high pH conditions, such as about 8 or more, about 10 or more, or about 12 or more. The second step is performed while the wastewater is manipulated to have an ORP between about −100 mV and about −800 mV. In some embodiments, the ORP is above −250 mV and in a particular embodiment the ORP is above −150 mV.

The pH may be raised by addition of any base, such as sodium hydroxide. The pH may be raised, for example, after the first step. Exemplary pH ranges are selected from about 0 to about 2, about 0 to about 3, about 0 to about 4, about 0 to about 5, and about 0 to about 6. For example, the pH may be from about 1 to about 2. Additional exemplary ranges are selected from about 8 to about 9, about 8 to about 10, about 8 to about 11, about 8 to about 12, about 8 to about 13, and about 8 to about 14.

In at least one embodiment, at least an 80% COD reduction may occur, resulting in approximately 96% effectiveness as the COD may drop from about 100,000 ppm to about 4,000 ppm. In some embodiments, COD reductions of greater than about 85% may be achieved, such as about 87%, about 90%, about 95%, or about 98%. Control over the ORP level results in a co-precipitation reaction with dissolved iron (Fe) metal where $Fe^{2+}$ is transformed into $Fe^{3+}$. In at least one embodiment, the wastewater treatment method excludes the addition and/or presence of polyaluminum chloride. In at least one embodiment, iron(III) is present in the first and/or second step but little or no iron(II) is present.

FIG. 1 is a Porbaix diagram which illustrates how ORP and pH control which iron species predominates in the aqueous system.

In at least one embodiment, the ORP is above about −500 mV or above about −250 mV. In some embodiments, the ORP is below about 800 mV or below about 550 mV. For example, the ORP may be from about 800 mV to about −500 mV, from about 800 mV to about −250 mV, from about 550 mV to about −500 mV, or from about 550 mV to about −250 mV. In some embodiments, the ORP may be from about −500 mV to about −250 mV. In certain embodiments, the ORP is above one or more of −250 mV, −225 mV, −200 mV, −190 mV, −175 mV, −170 mV, −160 mV, and −150 mV. In certain embodiments, the ORP is below one or more of 550 mV, 540 mV, 530 mV, 520 mV, 510 mV, 500 mV, 490 mV, 480 mV, 470 mV, and 460 mV. ORP may be adjusted using, for example, hydrogen peroxide.

ORP levels can be achieved and/or maintained using techniques, devices, and compositions known in the art, such as voltaic cells, anode-cathode arrangements, electrochemical equilibrium shifting compositions, and/or any method, composition, or device disclosed in U.S. Pat. Nos. 8,658,095, 8,641,888, 5,798,940, 7,141,175, 8,906,202, 5,342,510, 8,658,094, 5,218,304, 7,141,175, 3,951,711, and U.S. Patent Application Publication No. 2007/0090048, all of which are incorporated by reference into the present application in their entirety.

In at least one embodiment the COD removal process is achieved by a method, composition, and/or apparatus comprising one or more so described in any of the following references also including the above mentioned ORP controlled iron species, said references being: P. Bautista, A. F. Mohedano, M. A. Gilarranz, J. A. Casas, J. J. Rodriguez, *Application of Fenton oxidation to cosmetic wastewaters treatment*, J. Hazard. Mater. 143 (2007); F. El-Gohary, A. Tawfik, U. Mahmoud, *Comparative study between chemical coagulation/precipitation (C/P) versus coagulation/dissolved air flotation (C/DAF) for pre-treatment of personal care products (PCPs) wastewater*, Desalination 252 (2010) 106-112; J. A. Perdigon-Melon, J. B. Carbajo, A. L. Petre, R. Rosal, E. Garcia-Calvo, *Coagulation-Fenton coupled treatment for ecotoxicity reduction in highly polluted industrial wastewater*, J. Hazard. Mater. 181 (2010) 127-132; D. Puyol, V. M. Monsalvo, A. F. Mohedano, J. L. Sanz, J. J. Rodriguez, *Cosmetic wastewater treatment by upflow anaerobic sludge blanket reactor*, J. Hazard. Mater. 185 (2011) 1059-1065, X. Zeng, G. Sheng, H. Gui, D. Chen, W. Shao, J. Fu, *Preliminary study on the occurrence and distribution of polycyclic musks in a wastewater treatment plant in Guandong, China*, Chemosphere 69 (2007) 1305-1311; S. Suárez, M. Carballa, F. Omil, J. M. Lema, *How are pharmaceutical and personal care products (PPCPs) removed from urban wastewaters?* Rev. Environ. Sci. Biotechnol. 7 (2008) 125-138; P. Bautista, A. F. Mohedano, N. Menendez, J. A. Casas, J. J. Rodriguez, Catalytic wet peroxide oxidation of cosmetic wastewaters with Fe-bearing catalysts, Catal. Today 151 (2010) 148-152.

Without intending to be bound by a particular theory, it is believed that the specific constituents of cosmetic wastewater selectively react with iron(III). The presence of other iron species, such as iron(II), may inhibit or prevent this interaction. Thus, manipulating the ORP to control the type of iron species present in the system results in unexpected and superior effectiveness.

In at least one embodiment, the constituents of the wastewater are such that for a given pH, the required ORP needed to obtain the desired species of iron differs by more or less than about 10% when compared to a Pourbaix diagram, such as the one shown in FIG. 1, or any described in Pourbaix-Atlas. In at least one embodiment, the iron is maintained in only the iron(II) configuration, only the iron(III) configuration, or a combination of the iron(II) configuration and the iron(III) configuration.

EXAMPLES

The foregoing may be better understood by reference to the following examples, which are presented for purposes of illustration and are not intended to limit the scope of the disclosure.

A sample of high COD water was obtained from a cosmetics manufacturing plant. The COD was approximately 101,800 ppm but "high COD water" may contain from about 75,000 ppm to about 110,000 ppm COD. The sample was apportioned, treated, and COD reduction was measured using a COD reagent from HACH in connection with test method APHA 5220 D. A number of treatments were applied to portions of the sample according to certain prior art methods and these treatments are recited in Table 1. One prior art method included adding iron chloride ($FeCl_3$) to a sample until an initial flocculation effect occurred and the pH dropped to about 2. Then, the pH was raised to about 8 or 9. Subsequently, an acrylamide-acrylic acid flocculant was added to increase the size of the flocs. The flocs were then removed with a separation device. This prior art method was largely confined to the iron(II) range described in FIG.

1. Table 1 demonstrates that this method requires large amounts of iron to cause significant COD reduction.

A portion of the same wastewater was treated according to an inventive method of the present disclosure. The method involved included the steps of dosing the water with about 20,000 ppm $FeCl_3$ under mixing conditions, which lowered the pH from about 9 to about 2, causing solids formation. The solids were allowed to settle in a clarifier for about 1 to 2 hours. Sludge from the bottom was removed using an air operated diagramed pump. Next, sodium hydroxide (NaOH) was added to increase the pH from about 2 to about 10. While increasing the pH towards about 10, the dissolved iron came out of solution and co-precipitated the COD, thereby forming a solid precipitate. The ORP was maintained above about −250 mV and in some instances it was above about −150 mV to obtain substantial COD reduction. When the ORP fell below −250 mV, the COD reduction was poor. Hydrogen peroxide was dosed to the water to increase the ORP to above about −250 mV or above about −150 mV. This ORP level kept the iron in the $Fe^{3+}$ form, which allowed for good COD reduction. Controlling the pH and the ORP parameters kept the iron insoluble after COD reduction.

The water including the solids and having a pH of about 10 and an ORP greater than about −250 mV was then sent to a second stage clarifier. Dosage of about 20 ppm of an anionic polymer (about 30 mole % anionically charged) into the flocculation chamber was carried out in connection with mixing. Anionic charges of about 20 mole % to about 40 mole % are also expected to provide advantageous results. COD reduction in this second stage clarifier was from about 20,000 to about 4,000 ppm, which equates to about an 80% COD reduction. Sludge was disposed of from the bottom of the clarifier and the remaining water had very low turbidity. Clear water overflowed the clarifier. Sludge was collected from the bottom of the two clarifiers, combined, and dewatered in a sludge dewatering device. When the iron was allowed to be in a soluble form, the COD tended to be higher. Table 2 illustrates the effects of the process.

TABLE 1

|  | Program 1 | Program 2 | Program 3 | Program 4 | Program 5 |
|---|---|---|---|---|---|
| FeCl3 Dosage (ppm) | 30,000 | 35,000 | 40,000 | 50,000 | 60,000 |
| Final pH | 8.16 | 8.23 | 8.31 | 8.32 | 8.49 |
| Polymer added (ppm) | 20 | 20 | 20 | 20 | 20 |
| Final COD (ppm) | 36,600 | 31,550 | 24,850 | 19,600 | 9,400 |

TABLE 2

| 1st step | |
|---|---|
| FeCl3 Dosage (ppm) | 20,000 |
| pH | 2 (without acid addition) |
| Detention time (min) | 20 |
| COD (ppm) | 19,600 |
| 2nd step (treatment to the supernatant only) | |
| Final pH (with NaOH addition) | 10 |
| ORP (mV) | −160 |
| Polymer added (ppm) | 20 |
| COD (ppm) | 4,800 |

Comparing Tables 1 and 2, it can be seen that significantly less iron was needed to achieve much greater COD removal.

In the following Table 3, it can be seen that the presently disclosed process ("New Process") achieves superior COD removal as compared to the prior art method ("Old Process") and the total suspended solids (TSS) removal is near 100%.

TABLE 3

|  | COD | | | % COD Removal | | TSS | | |
|---|---|---|---|---|---|---|---|---|
| Date | Initial Waste | Old Process | New Process | Old Process | New Process | Initial Waste | New Process | % TSS Removal |
| 1-Sep | 61933 | 4087 | 2964 | 93.40% | 95.22% | 4,400 | 38 | 99.1% |
| 6-Sep | 65190 | 3900 | 3450 | 94.02% | 94.71% | 5,600 | 41 | 99.3% |
| 8-Sep | 69150 | 4779 | 3050 | 93.09% | 95.59% | 4,840 | 34 | 99.3% |
| 14-Sep | 66500 | 4268 | 2000* | 93.58% | 96.99% | 6,320 | 44 | 99.3% |

While this invention may be embodied in many different forms, there are described herein specific preferred embodiments. The present disclosure is an exemplification of the principles of the invention and is not intended to limit the invention to the particular embodiments illustrated herein. All patents, patent applications, scientific papers, and any other reference materials mentioned in this disclosure are incorporated by reference in their entirety. Furthermore, the invention encompasses any possible combination of some or all of the various embodiments mentioned, described, and/or incorporated herein.

This disclosure is intended to be illustrative and not exhaustive. Alternatives and variations of the embodiments described herein are intended to be included within the scope of the present disclosure. Those familiar with the art may recognize equivalents to the specific embodiments described herein and such equivalents are intended to be encompassed by this disclosure.

All ranges and parameters disclosed herein are understood to encompass any and all subranges subsumed therein and every number between the endpoints. For example, a stated range of "1 to 10" should be considered to include any and all subranges between (and inclusive of) the minimum value of 1 and the maximum value of 10. That is, all subranges beginning with a minimum value of 1 or more, (e.g., 1, 2, 6.1) and ending with a maximum value of 10 or less (e.g., 2.3, 4, 7, 8.7). Additionally, any disclosed range also encompasses individual numbers that fall within the range. For example, if a range from 1 to 10 is disclosed, it is to be understood that this range includes 1, 2, 3, 4, 5, 6, 7, 8, 9, and 10, individually. All percentages, ratios, and proportions herein are by weight unless otherwise specified. Unless otherwise indicated herein, molecular weight or "MW" refers to molecular weight as measured by weight average.

What is claimed is:

1. A method of reducing chemical oxygen demand of wastewater, comprising:
   contacting the wastewater containing a contaminant with an iron compound at a pH of about 3 or less;
   forcing the iron compound to assume an iron(II) species, the iron(II) species being formed by maintaining an oxidation reduction potential (ORP) of the wastewater at a level above about −500 mV;
   allowing the iron(II) species and the contaminant to form a precipitate;
   removing the precipitate; and
   adding a flocculant to the wastewater at a pH of about 8 or higher and maintaining the ORP of the wastewater at above −250 mV to transform the iron (II) species to an iron (III) species,
   wherein the contaminant comprises a member selected from the group consisting of a sizing agent, a wetting chemical, a softening agent, a surfactant, an oil, a fragrance, and any combination thereof.

2. The method of claim 1, wherein the flocculant comprises a polymer.

3. The method of claim 1, wherein the wastewater is from a cosmetic manufacturing process or a personal care product manufacturing process.

4. The method of claim 2, wherein the polymer comprises acrylic acid and acrylamide.

5. The method of claim 1, wherein the iron(II) species is formed by maintaining the ORP of the wastewater at the level above about −250 mV.

6. The method of claim 5, wherein the iron(II) species is formed by maintaining the ORP of the wastewater at the level from about −250 mV to about −150 mV.

7. The method of claim 1, wherein the flocculant is an anionic polymer.

8. The method of claim 7, wherein the anionic polymer is about 20 mole % to about 40 mole % anionically charged.

9. The method of claim 1, wherein the flocculant is added to the wastewater at a pH about 10.

* * * * *

UNITED STATES PATENT AND TRADEMARK OFFICE
CERTIFICATE OF CORRECTION

PATENT NO. : 10,252,926 B2
APPLICATION NO. : 15/253459
DATED : April 9, 2019
INVENTOR(S) : Nugraha Yohanes Arifpin et al.

It is certified that error appears in the above-identified patent and that said Letters Patent is hereby corrected as shown below:

In the Claims

In Column 9, Claim 1, Line 9 delete "m V;" and insert -- mV; --, therefor.

In Column 10, Claim 5, Line 10 delete "m V." and insert -- mV. --, therefor.

In Column 10, Claim 6, Line 13 delete "m V" and insert -- mV --, therefor.

In Column 10, Claim 6, Line 13 delete "m V." and insert -- mV. --, therefor.

Signed and Sealed this
Tenth Day of September, 2019

Andrei Iancu
*Director of the United States Patent and Trademark Office*